INVENTORS
ROY H. GOVAN
HAROLD J. MEEK
BY *Alvin Browdy*
ATTORNEY

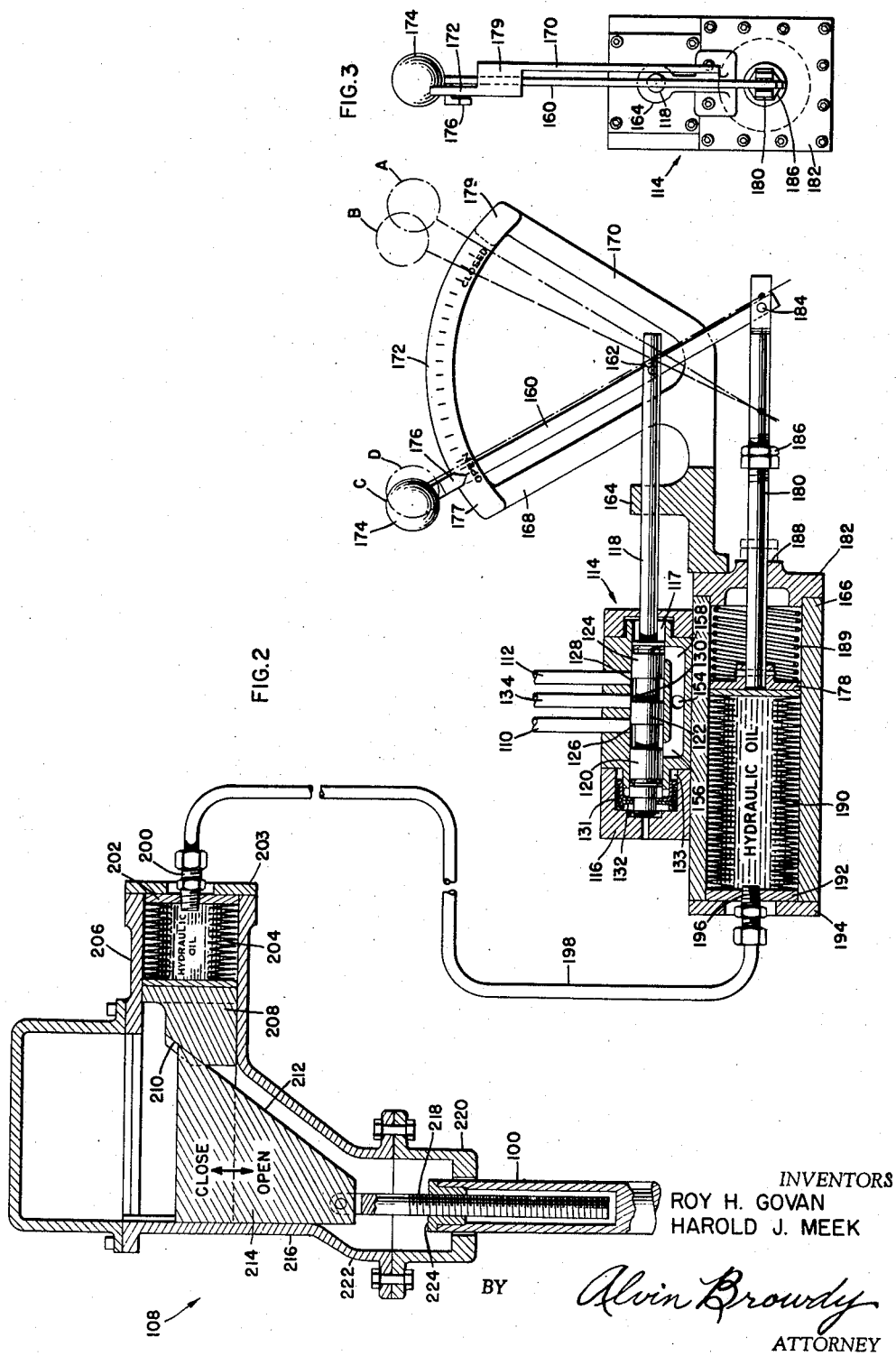

United States Patent Office 2,888,029
Patented May 26, 1959

2,888,029

HYDRAULIC SYSTEM FOR CONTROL OF A VALVE AND FOLLOW-UP INDICATOR

Roy H. Govan, Hoboken, N.J., and Harold J. Meek, Staten Island, N.Y., assignors to Jaroco Engineering Co., Hoboken, N.J., a corporation of New Jersey Application May 23, 1956, Serial No. 586,867

9 Claims. (Cl. 137—344)

The present invention relates to a hydraulic system for controlling a remotely positioned valve.

More particularly, the present invention relates to a hydraulic system for controlling the operation of a valve that is located in a position remote from the valve control station, the valve being positioned, for example, in a fluid conduit that extends into the hold of a marine vessel or the like.

This application is a continuation-in-part of application Serial No. 520,769 for Hydraulic System filed July 8, 1955 now abandoned.

Prior to the instant invention, the heretofore known control valves for use in controlling the flow of fluid in remotely positioned fluid conduits in ships have been manually operated, comprising a gate valve in communication with the bore of the fluid conduit and coupled to an elongated stem that extended upwardly from the valve and through the deck of the ship. A control lever or wheel located on the deck of the ship was secured to the valve stem and was adapted to be manually operated to open or close the remotely positioned valve. These heretofore known manually operated reach valves were objectionable since they were not only difficult to operate by hand due to faulty seating and rusty gears, but in ships that included multiple control valves the operator had to walk to each control station to operate the associated valve. It is seen that during the loading operation of the vessel, the operator would experience difficulty in maneuvering to each valve control station and, in addition, if any of the valves failed to operate, the loading operation would be considerably delayed. By controlling the remotely positioned valves by a hydraulic system, ease of operation would be assured and furthermore a single control station could be provided for all of the remotely positioned valves.

In controlling the operation of a remotely positioned valve, it is desirable to be able to instantaneously determine the relative position of the valve with respect to fluid conduit in which the valve is located. In the heretofore known hydraulic controlled fluid loading systems, the operator of the system merely opened the valve fully or fully closed the valve. There was no means for determining an intermediate position of the valve in the conduit, which intermediate position was frequently desirable when the fluid was being metered into the fluid receptacles.

It is furthermore desirable in controlling the flow of a fluid through a conduit at a remotely positioned control station, to set the conduit valve in a predetermined position to allow the fluid to be metered through the conduit for an indefinite period of time, that is, until the fluid receptacle or tank is fully loaded. Heretofore this was not possible in controlling fluid flow through conduits in marine vessels since in the prior known systems the remotely positioned valve was either fully opened or fully closed.

It is an object of the present invention to provide a hydraulic system that includes a control station that is adapted to control the operation of a valve located in a remotely positioned fluid conduit.

Another object of the present invention is to provide a hydraulic system for use in controlling flow of fluid into the hold of a marine vessel, wherein a fluid operated motor is controlled by a remotely positioned control valve.

Still another object of the present invention is to provide a hydraulic system for controlling the flow of fluid into the hold of a ship wherein a hydraulic accumulator is adapted to supply fluid under pressure to a multi-way control valve, the multi-way control valve distributing the fluid under pressure to a motor that is adapted to operate a valve located in a fluid conduit that extends into the hold of the ship.

Still another object of the present invention is to provide a hydraulic system for use in marine vessels wherein a remotely positioned valve is controlled by a control valve, the position of the remotely positioned valve being indicated by the position of the manual control handle of the control system.

Still another object of the present invention is to provide a hydraulic system for use in marine vessels wherein a fluid control valve is operatively connected to a follow-up device that is responsive to the movement of a remotely positioned valve, the follow-up device cooperating with the control valve to indicate the position of the remotely positioned valve.

Still another object of the present invention is to provide a control valve for a hydraulic system wherein a spring member is adapted to bias the control valve to a neutral position, thereby setting a remotely controlled valve in a predetermined position.

Other objects and the nature and advantages of the instant invention will be apparent from the following description taken in conjunction with the accompanying drawings, wherein:

Fig. 2 is an enlarged view of the follow-up system illustrated in Fig. 1 with parts shown in section, and Fig. 3 is an end elevational view of the control valve housing and manual control of the follow-up system shown in Fig. 2.

Figure 1:
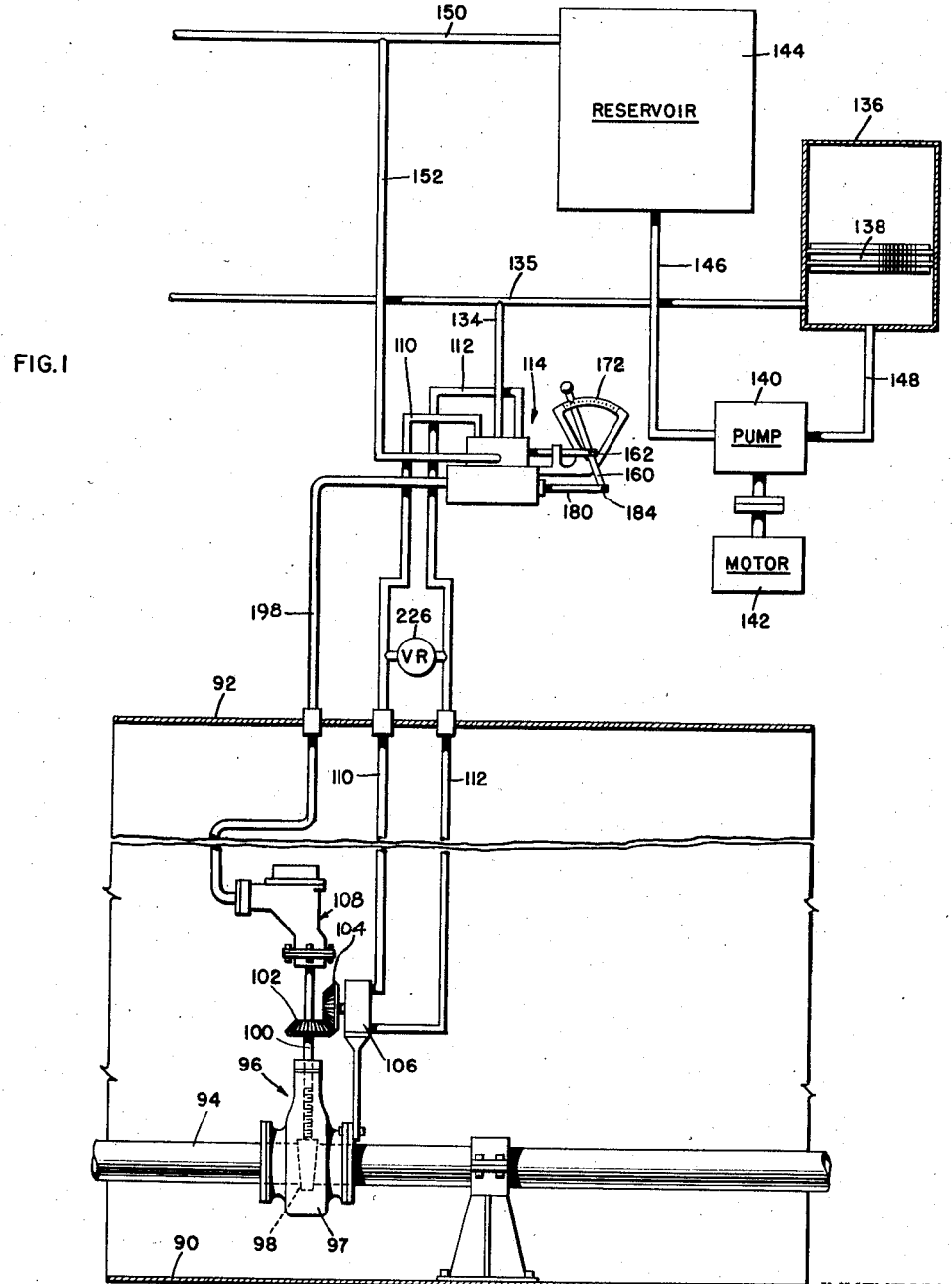
Fig. 1 is a diagrammatic illustration of the hydraulic system embodied herein showing a control means located above the deck of a marine vessel for controlling the flow of fluid through a conduit extending into the hold of the vessel which includes a follow-up system for indicating the position of a remotely positioned valve.

Although the present invention is directed primarily toward controlling the flow of fluid into marine vessels, it is understood that the invention may be applied whenever it is desired to control from a remote position the flow of fluid through a conduit.

Referring now to the drawings, the shell of the marine vessel on which the control system is installed is indicated at 90 and the deck of the vessel is indicated at 92. Extending into the hold of the vessel is a fluid conduit 94 that is adapted to convey liquid to the ship's tanks or receptacles. Positioned in the conduit 94 adjacent the inlet to a fluid receptacle is an actuating valve assembly generally indicated at 96. The valve assembly 96 comprises a valve body 97 which is secured to the conduit 94 and which has disposed therein a valve 98 of any suitable design.

The valve 98 is adapted to be vertically moved into and out of communication with the bore of the fluid conduit 94 and thereby control the flow of fluid therethrough. Secured to a shaft 100 that operatively engages the valve 98 is a bevel gear 102, the bevel gear 102 engaging a similar bevel gear 104. The bevel gear 104 is adapted to be rotated by a hydraulic motor 106 that is of the rotary type of any suitable construction. Any suitable translation device (not shown) is employed with the valve shaft 100 for vertically moving the valve 98 when the shaft 100 is rotated by the motor 106, thereby raising or lowering the valve 98 into and out of communication with the bore of the conduit 94. The valve shaft 100 also extends upwardly beyond the bevel gear 102, and into a housing generally indicated at 108, that forms part of a follow-up indicating system to be described in detail hereinafter.

Communicating with the hydraulic motor 106 are fluid conduit lines 110, 112 that direct motive fluid to the motor 106 for causing rotary movement of the motor in the desired direction. It is understood that the fluid conduit lines also serve as exhaust conduits for the motive fluid depending upon the direction of rotation of the motor 106. The fluid conduit lines 110, 112 extend upwardly from the motor 106 and pass through the deck 92 being conveniently sealed therein. The conduits 110, 112 communicate with a multi-way control valve generally indicated at 114, the multi-way control valve being positioned at a remote control station located at any convenient point on the deck of the ship.

As shown in Figure 2, the multi-way control valve 114 comprises a housing 116 which has an internal cavity or chamber 117 formed therein. Slidably positioned within the control valve chamber 117 is a spool 118 which has lands 120, 122 and 124 formed thereon for controlling the flow of motive fluid to and from the fluid conduit lines 110 and 112. Cooperating with the lands 120 and 124 for controlling flow of fluid through the conduits 110, 112 are ports 126, 128 the ports being formed in the upper wall of the housing 116. In order to introduce motive fluid into the chamber 117 a fluid inlet port 130 is formed in the housing 114 and is positioned midway between the ports 126, 128. The inlet port 130 thus communicates with either the port 110 or port 112 through cavity 117 depending upon the desired direction of rotation of the motor 106 and consequently the direction of movement of the valve 98. The spool 118 is normally maintained in a neutral position whereby communication between the inlet port 130 and ports 110 or 112 is blocked by the land 122 thereby causing the valve 98 to be held in the position to which it has been moved. A coil spring 131 is adapted to normally move the spool 118 to the neutral position and is located between a split carrier 132 that is positioned in an annular recess 133 formed in the left side of the control valve housing 114 as seen in Fig. 2.

Motive fluid is introduced to the inlet port 130 through a fluid inlet conduit 134 that communicates therewith and that is connected to a source of motive fluid such as a fluid inlet header 135. The fluid inlet header 134 communicates with an hydraulic accumulator 136 that is adapted to provide a constant supply of motive fluid under pressure to the multi-way control valve 114. Located in the accumulator is a floating piston 138 that divides the accumulator into an upper pressure chamber and a lower chamber. The upper chamber of the hydraulic accumulator is adapted to be supplied with a gas medium under pressure, such as nitrogen, thereby precharging the upper chamber to a predetermined pressure. A positive displacement pump 140 driven by a motor 142 is adapted to supply motive fluid to the lower chamber of the accumulator from a reservoir 144 through lines 146 and 148. The pump 140 is provided with a pressure holding device and is adapted to maintain the motive fluid under pressure in the accumulator, the amount of pressure being determined by the precharge of the pressure gas in the upper chamber of the accumulator 136. It is understood that when the pressure of the motive fluid accumulator 136 falls below the predetermined amount, the pump pressure holding device of the pump 140 will respond to cause the pump 140 to supply the necessary amount of fluid to the accumulator until the predetermined pressure therein is again reached. The reservoir 144 which supplies the motive fluid to the accumulator 136 by way of the pump 140 receives motive fluid from the conduit 150 that communicates with the exhaust line 152 which, as shown in Fig. 2, communicates with the cavity or chamber 117 in the control valve 114 through a port 154 and passageways 156 or 158.

Referring now particularly to Fig. 2, the follow-up indicating system is illustrated and includes a control handle 160 that is pivotally secured at 162 adjacent the extended end of the spool 118. The spool 118 is supported in a guide 164 that is mounted on a housing 166 of the follow-up device to be described below. Joined to the guide 164 is a quadrant defined by the arms 168, 170 and an arcuately formed scale 172. The handle 160 includes a knob 174 and an offset pointer 176 that overrides the scale 172 and is adapted to cooperate therewith for indicating the position of the actuating valve 98 in the conduit 94. The scale 172 may be calibrated in any manner desired, the limits thereof being defined by stops 177 and 179 which indicate the open and closed position, respectively, of the valve 94.

In order that the operator of the hydraulic control system may be constantly aware of the position of the valve 98 in the conduit 94, the follow-up indicating and control system is provided, and includes the housing 166 which defines a cylinder and in which is located a piston 178. Secured to the piston 178 is a rod 180 that extends through an end wall 182 of the cylinder 166, the outer end of the rod 180 being pivotally connected at 184 to the lower end of handle 160. An adjustment nut 186 threadably engages a threaded portion formed on the rod 180 and is adapted to contact an abutment 188 formed on the cylinder end wall 182 thereby limiting inner movement of the rod 180 and piston 178. A coil spring 189 encircles the rod 180 within the cylinder 166, abutting against the piston 178 and the inner surface of the end wall 182, and thereby normally biasing the piston 178 toward the left as seen in Figure 3. Resisting the movement of the piston 178 to the left is a bellows 190 that bears against the outer surface of the piston and against a plate 192 secured to an end wall 194 of the cylinder 166. Communicating with the interior of the bellows 190 is a nipple 196 that is secured to the plate 192 and has a hydraulic fluid conduit 198 connected thereto. Connected to the opposite end of the conduit 198 is a nipple 200 that is secured in the housing 108 to a plate 202 mounted in an end wall 203 of the housing 108. The nipple 200 extends into the interior of a second bellows 204 that is located in a cylindrical portion 206 of the housing 108, the bellows 204 thus communicating with the bellows 190 in the cylinder 166 through the conduit 198 and defining a closed fluid system therewith. A hydraulic fluid is disposed in the closed fluid system, and it is seen that movement of either bellows through an external force will cause the other bellows to move a corresponding amount in response to the non-compressive action of the hydraulic fluid.

In order to actuate the bellows 204, a follower 208 is joined thereto and is formed with an angular face 210 that coacts with an angular face 212 formed on a vertically movable cam 214. The cam 214 is adapted to slide vertically in a cylinder 216 formed in the housing 108 and has secured to the lowermost end thereof a threaded rod 218. The threaded rod 218 extends through a lower tubular portion 220 secured to an offset portion 222 of the cylinder 216 and is threadably engaged by a nut 224 mounted in the uppermost end of the shaft 100. It is seen that rotation of the shaft 100 will reciprocate the threaded rod 218 and thereby vertically move the cam 214. Movement of the cam 214 will be reflected by movement of the follower 208 and a corresponding movement of the bellows 204. The bellows 190 in response to movement of the bellows 204 then moves the piston 178 and rod 180 to shift the pivot point 184. As the pivot point 184 shifts, the floating handle 160 will move along the quadrant, the pointer 176 indicating the relative position of the valve 98 on the scale 172.

In describing the operation of the hydraulic system it is first assumed that the valve 98 is fully opened and is to be moved to the closed position or to some position intermediate fully open and fully closed.

The operator of the system who is located at a central control station moves the control handle 160 in a clockwise direction as seen in Fig. 2, the handle as shown being located in the fully open position abutting against the stop 177. The spool 118 is thus moved to the right against the returning action of the spring 131 to position the port 126 and conduit 110 in communication with the inlet port 130 and inlet conduit 134. Motive fluid then flows through the conduit 134, into conduit 110 and then into the motor 106 to rotate the motor in the required direction. Simultaneously, upon movement of the spool 118 as described, the port 128 is uncovered by the land 124 for communication with the passage 158 and exhaust port 154. Fluid is then exhausted from the motor 106, through the conduit 112 and into the conduit 152 which returns the fluid to the reservoir 144.

As the valve 98 begins to close, the pivot 162 of the valve spool 118 remains stationary and it is seen that movement of the rod 180 will cause the handle 160 to pivot about the pivot 162, the pointer 176 reflecting the position of the valve 98 during the movement thereof. As the valve 98 closes, that is, moves downwardly, the shaft 100 is rotated through the motion translating device (not shown), thereby causing the rod 218 of the follow-up system to move upwardly. As the rod 218 moves upwardly, the cam 214 is slidably moved upwardly, the angular face 212 retreating from engagement with the angular face 210 of the follower 208. The bellows 204 expands and the hydraulic fluid is forced therein exhausting from the bellows 190. The spring 189 forces the piston 178 to the left compressing the bellows 190 and moving the piston rod 180 to the left. The pivot point 184 is thus continuously shifted to the left and the floating handle 160 pivots about the point 162 to move toward the stop 179 which defines the closed position.

If the operator releases the handle 160 at any time during the closing operation, the spring 131 will return the spool 118 to a neutral position and communication between the inlet port 130 and ports 126 or 128 is blocked by the land 122. The handle 160 is thus moved slightly to the right but remains in the intermediate position until the operator grasps the handle and moves the spool 118 to the right again to overcome the returning action of the spring 131. It is seen, therefore, that the actuating valve 98 may be set in any desired position by simply releasing the handle 160. It is furthermore seen that in operation of the system, the operator must continuously grasp the handle with an even pressure to overcome the action of the spring 131 thereby locating inlet port 130 in communication with either port 126 or 128, but the pressure of the operator must not be sufficient to overcome movement of the handle in response to the follow-up indicating system.

During the closing operation, when the rod 180 has moved to the left sufficiently to locate the handle 160 in abutting relation with the stop 179 (position A), the adjustment nut 186 has moved into contact with the abutment 188, as shown in dotted lines in Fig. 2. Further movement of the rod 180 is thereby restrained and the bellows system no longer exerts an operating force on the system. However, the motive fluid continues to flow through the line 110 keeping the motor 106 in continuous operation. It is seen therefore that the actuating valve is moved to the end of travel in the bore of the conduit and pressure is exerted thereon to effect a tight seal. In order to prevent the valve 98 from being jammed in the lower or closed position, a relief valve 226 (Fig. 1) is provided and is located between the fluid conduit lines 110 and 112. The relief valve is set to open at a predetermined pressure and when the valve 98 is firmly seated, the relief valve 226 opens to recirculate the motive fluid back through the control valve 114 and into the reservoir 144. Once the valve 98 is seated, the operator releases the handle 160 and the spring 131 returns the spool 118 and handle 160 to the neutral position, the handle 160 assuming position B.

In opening the actuating valve 98, the handle 160 is held with an even pressure and is moved in a counterclockwise direction. The spring 131 is depressed as shown in Fig. 2 and motive fluid is directed to the conduit 112 by way of conduit 134, port 130 and port 128. Simultaneously, fluid is exhausted through conduit 110, port 126, passage 156, exhaust port 154, and exhaust conduit 152. The position of the valve 98 is instantaneously indicated by the follow-up indicating system, the rod 218 moving downwardly in response to rotation of shaft 100 thereby forcing the cam 214 downwardly and depressing the bellows 204. Hydraulic fluid is forced into bellows 190 thereby moving the piston 178 and rod 180 to the right. The pivot point 184 is shifted accordingly, and the handle 160 is moved steadily to the left as the valve 98 closes. When the handle 160 reaches the fully open position, and abuts against the stop 177 (position C), additional movement of the rod 180 to the right then moves the spool 118 to the right to cause the spool land 122 to lap the port 130. The operator then releases handle 160 and the spring 131 shifts the handle 160 slightly to the right to position D, as shown in dotted lines. The control valve 114 is then located again in neutral position.

It is thus seen, as described above that rotation of the motor 106 is stopped when the valve 98 is fully opened, thus preventing the threads on the shaft 100 from jamming and being stripped.

In the operation of closing and opening the valve 98, described above, the motive fluid is supplied from the accumulator 136 under pressure.

It will be obvious to those skilled in the art that various changes may be made without departing from the spirit of the invention and therefore, the invention is not limited to what is shown in the drawings and described in the specification, but only as indicated in the appended claims.

What is claimed is:

1. In a hydraulic system for remotely controlling the flow of fluid into the hold of a marine vessel, a fluid conduit located in said hold, an actuating valve associated with said fluid conduit and controlling the flow of fluid therethrough, a hydraulic motor operatively connected to said valve for moving said valve into and out of engagement with the bore of said fluid conduit, a multi-way control valve operatively connected to said hydraulic motor, a hydraulic fluid accumulator communicating with said control valve for supplying operating fluid under pressure thereto, a source of operating fluid communicating with said accumulator, pump means for supplying said operating fluid from said source to said accumulator, a manual control operatively connected to said control valve for controlling the operation thereof for directing said operating fluid under pressure from said accumulator to said motor, said actuating valve thereby being remotely operated for controlling the flow of fluid into the hold of said marine vessel, and indicating means operatively connected to said actuating valve for indicating the position of said actuating valve in said fluid conduit, said indicating means including a closed fluid follow-up system operatively connected to said actuating valve and said manual control, said follow-up system being responsive to movement of said actuating valve to impart movement to said manual control, the position of said manual control reflecting the relative position of said actuating valve in said fluid conduit.

2. In a hydraulic system for remotely controlling the admission of fluid into the hold of a vessel, a fluid conduit located in said hold, an actuating valve associated with said conduit, a hydraulic motor controlling the operation of said actuating valve, a multi-way control valve operatively connected to said motor for controlling the operation thereof, a hydraulic fluid accumulator communicating with a source of operating fluid and said control valve, a manual control connected to said control valve for admitting said operating fluid thereto, said operating fluid being directed to said hydraulic motor for operating said actuating valve, and means for indicating the position of a said actuating valve in said fluid conduit, said indicating means including a closed fluid follow-up system operatively connected to said manual control, said follow-up system being responsive to movement of said actuating valve to move said manual control a corresponding amount thereby indicating the relative position of said actuating valve.

3. In a hydraulic system for remotely controlling the flow of fluid to a marine vessel, a fluid conduit located in said vessel, an actuating valve adapted to be moved into communication with the bore of said fluid conduit, a hydraulic motor for controlling the operation of said actuating valve, a control valve for controlling the operation of said motor, a hydraulic fluid accumulator communicating with said control valve for supplying motive fluid under pressure thereto, pump means communicating with said accumulator for supplying said motive fluid thereto until a predetermined pressure is reached a manual control connected to said control valve for admitting said motive fluid thereto, said motive fluid being directed to said hydraulic motor for operating said first-named valve, and means for indicating the relative position of said actuating valve in said fluid conduit, said indicating means including a closed fluid follow-up system operatively connected to said actuating valve and to said manual control, said follow-up system responding to movement of said actuating valve to move said manual control a corresponding amount, thereby indicating the position of said actuating valve.

4. In a hydraulic system for controlling the flow of fluid into the hold of a marine vessel, a fluid conduit located in said hold, an actuating valve communicating with said fluid conduit, means for controlling the position of said actuating valve in said fluid conduit, fluid lines operatively connected to said control means, a control valve located at a remotely positioned control station communicating with said control means through said fluid lines for controlling the operation thereof, said fluid lines extending upwardly from said control means in said hold and through the deck of said vessel to said control station, a manual control connected to said control valve for directing motive fluid into said fluid lines for effecting operation of said control means, and indicating means operatively connected to said actuating valve for indicating the position thereof in said fluid conduit, said indicating means including a closed fluid system that is responsive to movement of said actuating valve, said manual control being responsive to movement of said closed fluid system to reflect the relative position of said actuating valve in said fluid conduit.

5. In a hydraulic system for controlling the relative position of a remotely positioned valve, a multi-way control valve for controlling the movement of said valve, a spool positioned in said valve, resilient means for normally biasing said control valve to a neutral position, a floating lever provided with an indicating means at one end thereof, a rod attached to said spool at one end thereof and pivotally secured at its other end to said floating lever at an intermediate point thereon, whereby pressure applied to said floating lever exceeding the biasing pressure of said resilient means will move said spool and thereby control the movement of said remotely controlled valve, a follow-up system responsive to movement of said remotely positioned valve, said follow-up system including a reciprocable member responsive to movement of said valve connected to the other end of said floating lever, whereby movement of said valve acts through the follow-up system to reciprocate said member and said floating lever so that the indicating means on said lever indicates at all times the relative position of said remotely positioned valve.

6. In a system as set forth in claim 5, wherein said follow-up system comprises a closed hydraulic fluid system which acts in response to the movement of said valve to reciprocate said reciprocable member.

7. In a system as set forth in claim 5, wherein said follow-up system comprises a closed hydraulic fluid system including a first bellows and a second bellows, a cam, a cam follower engaging said first bellows and responsive to movement of said cam, means for moving said cam in response to movement of said valve, said second bellows operatively engaging said reciprocable member for causing reciprocable movement thereof corresponding to movement of said first bellows.

8. In an indicating system, a valve located in a conduit, means for reciprocating said valve, means for controlling said reciprocating means, a floating lever defining an element of said controlling means, a follow-up system operatively connected to said valve and to said controlling means, said follow-up system including a closed hydraulic fluid system that is responsive to movement of said valve, a reciprocating member responsive to said hydraulic fluid system and pivotally secured to said floating lever, said floating lever being movable by said member in response to movement of said valve to indicate the relative position of said valve of said conduit, said closed hydraulic fluid system comprising a first bellows and a second bellows, a cam reciprocable in response to movement of said valve, a cam follower engaging said first bellows and responsive to movement of said cam, said second bellows operatively engaging said reciprocable member for causing reciprocable movement thereof corresponding to movement of said first bellows.

9. In a hydraulic system for controlling the relative position of a remotely positioned member, a control valve for controlling the movement of said member, a hydraulic motor operatively connected to said control valve and said member, means for indicating the position of said member, said indicating means including a cam operatively connected to said member and movable in response thereto, a fluid system responsive to movement of said cam, a control handle operatively connected to said fluid system and movable in response thereto, for indicating the relative position of said member, said control handle being further movable to actuate said control valve to control movement of said hydraulic motor and remotely positioned member, said control valve including a resilient means for normally biasing said control valve to a neutral position, said control valve returning to said neutral position upon release of said control handle.

References Cited in the file of this patent

UNITED STATES PATENTS

| | | |
|---|---|---|
| 322,114 | Leach | July 14, 1885 |
| 1,492,856 | Curdy | May 6, 1924 |
| 2,189,475 | Saur | Feb. 6, 1940 |
| 2,192,963 | Davis | Mar. 12, 1940 |
| 2,253,246 | Norton | Aug. 19, 1941 |
| 2,480,651 | Hawkins | Aug. 30, 1949 |
| 2,578,959 | Yarborough | Dec. 18, 1951 |
| 2,579,840 | Levy | Dec. 25, 1951 |
| 2,679,854 | Stevenson | June 1, 1954 |
| 2,781,744 | Williams | Feb. 19, 1957 |

FOREIGN PATENTS

| | | |
|---|---|---|
| 42,601 | Germany | of 1910 |